US010425627B2

(12) United States Patent
Zhang et al.

(10) Patent No.: US 10,425,627 B2
(45) Date of Patent: Sep. 24, 2019

(54) AUTOMATED PRESENTATION EQUIPMENT TESTING

(71) Applicant: Microsoft Technology Licensing, LLC, Redmond, WA (US)

(72) Inventors: Zhengyou Zhang, Bellevue, WA (US); Zicheng Liu, Bellevue, WA (US); Dieni Afonso Ferreira Florencio, Redmond, WA (US); Sasa Junuzovic, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/590,501

(22) Filed: May 9, 2017

(65) Prior Publication Data

US 2018/0332261 A1 Nov. 15, 2018

(51) Int. Cl.
| | |
|---|---|
| *H04N 9/31* | (2006.01) |
| *H04N 17/04* | (2006.01) |
| *H04N 17/00* | (2006.01) |
| *G09G 3/00* | (2006.01) |
| *H04N 21/4223* | (2011.01) |

(Continued)

(52) U.S. Cl.
CPC .......... *H04N 9/3194* (2013.01); *G09G 3/006* (2013.01); *G09G 3/20* (2013.01); *H04N 1/6044* (2013.01); *H04N 7/15* (2013.01); *H04N 17/00* (2013.01); *H04N 17/045* (2013.01); *H04N 21/4223* (2013.01); *H04N 21/4424* (2013.01); *G09G 2330/12* (2013.01); *G09G 2360/145* (2013.01); *H04N 21/41415* (2013.01)

(58) Field of Classification Search
CPC ............... H04N 9/3194; H04N 17/045; H04N 21/4223; G05B 23/0267; G09G 3/006

USPC ........................................................ 348/181
See application file for complete search history.

(56) References Cited

U.S. PATENT DOCUMENTS

| | | |
|---|---|---|
| 8,320,257 B2 | 11/2012 | Srivastava et al. |
| 8,665,310 B2 | 3/2014 | Verthein et al. |
| (Continued) | | |

FOREIGN PATENT DOCUMENTS

| | | |
|---|---|---|
| JP | 2007279643 A | 10/2007 |
| WO | 2014172678 A1 | 10/2014 |

OTHER PUBLICATIONS

Park, et al., "Auto-calibration of multi-projector displays with a single handheld camera", In Proceedings of IEEE Scientific Visualization Conference, Oct. 25, 2015, pp. 65-72.

*Primary Examiner* — Michael Lee
(74) *Attorney, Agent, or Firm* — Schwegman Lundberg & Woessner, P.A.

(57) ABSTRACT

An apparatus that automatically monitors a display device includes a photo sensor configured to receive light from a display screen of the display device. The photo sensor provides signals representing detected light levels to a processor. The processor is coupled to the display device and is configured to cause the display device to present a test sequence including a plurality of images on the display screen. The processor is configured to capture data from the photo sensor during the presentation of the test sequence and to compare the captured data to an expected sequence corresponding to the test sequence displayed by a well-functioning display. The processor is further configured to report any mismatch between the captured data and the expected sequence as a possible malfunction of the display device.

21 Claims, 7 Drawing Sheets

(51) Int. Cl.
*H04N 21/442* (2011.01)
*G09G 3/20* (2006.01)
*H04N 7/15* (2006.01)
*H04N 1/60* (2006.01)
*H04N 21/414* (2011.01)

(56) References Cited

U.S. PATENT DOCUMENTS

| | | | |
|---|---|---|---|
| 9,015,241 | B2 | 4/2015 | Bedingfield |
| 2003/0103075 | A1 | 6/2003 | Rosselot |
| 2005/0041139 | A1* | 2/2005 | Lowles ................ G09G 3/3406 |
| | | | 348/362 |
| 2006/0012672 | A1 | 1/2006 | Schrader et al. |
| 2008/0043297 | A1* | 2/2008 | Shiu ........................ H04N 9/73 |
| | | | 358/509 |
| 2008/0218501 | A1* | 9/2008 | Diamond ................ G09G 3/22 |
| | | | 345/207 |
| 2009/0122132 | A1* | 5/2009 | Thielman .............. G06F 3/1423 |
| | | | 348/14.08 |
| 2012/0013583 | A1* | 1/2012 | Powell .................. G06F 1/1637 |
| | | | 345/207 |
| 2012/0293605 | A1 | 11/2012 | Seferian et al. |
| 2013/0107060 | A1* | 5/2013 | Wei ......................... G09G 3/36 |
| | | | 348/191 |
| 2013/0182083 | A1* | 7/2013 | Grossmann .......... H04N 13/327 |
| | | | 348/51 |
| 2014/0049527 | A1* | 2/2014 | Lanzoni .................. G09G 3/36 |
| | | | 345/207 |

* cited by examiner

AUTOMATED PRESENTATION EQUIPMENT TESTING

BACKGROUND

To facilitate communication among its employees, many companies provide display devices and video cameras in venues of their facilities. These venues may include a dedicated venue system, having a display screen, a video camera, and audio input and output devices. A large company may have many such venues in their facilities.

SUMMARY

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

In one embodiment, an apparatus that automatically monitors a display device includes a photo sensor configured to receive light from a screen of the display device. The photo sensor provides signals representing the detected light levels to a processor. The processor is coupled to the display device and is configured to cause a display device to present a test sequence including a plurality of images on the display screen. The processor is configured to capture data from the photo sensor during the presentation of the test sequence and determine whether the captured data indicate errors in the displayed test sequence. The processor is further configured to record any errors in the displayed test sequence as a possible malfunction of the display device.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description when considered in conjunction with the drawings.

DETAILED DESCRIPTION

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

The following describes apparatus and methods for automatically monitoring electronic equipment (e.g. display devices and/or imaging devices) in a venue. As used the electronic equipment may be used for any multi-party communication or presentation either local to the venue 102 or with participants remote from the venue 102 including both interactive (e.g. web conference, application sharing, multi-participant on-line game, peer-to-peer conference, etc.) and non-interactive (e.g. local, multicast, or broadcast presentation, screen sharing, web streaming service, etc.) while the venue 102 is shown as a conference room, it is contemplated that systems according to the embodiments described below may be implemented in other venues, such as theaters, sports stadiums and outdoor advertising venues.

In the examples described below, a processor is configured to cause the display device to display a test sequence while a photo sensor captures light emitted by the display device. In one embodiment, the processor causes a display device to display a sequence of monochromatic primary color images (e.g. red, green, blue) and causes a photodetector or imager to capture light emitted by the display screen (or reflected by the screen in the case of projection screens). The light emitted by the display may reach the photodetector or imager directly or after reflections on walls, furniture, or other elements in the room. The processor is configured to analyze the captured light indicates errors in the displayed test sequence. This may be done, for example by comparing signals representing the captured light to an expected sequence. The expected sequence may be a calibration sequence previously acquired in the same environment, a characteristic expected from the knowledge of the displayed image sequence, or the input data to the display device. Any mismatch between the captured data and the expected sequence may indicate a malfunctioning display or photo sensor or that the display or, when a calibration sequence is used, that the photo sensor have been moved from the positions at which the calibration sequence was captured. These mismatches may be reported to a central server so that the display device and/or photo sensor may be serviced. The operation of the display device and photo sensor may be controlled locally by a processor in the venue or remotely by a central server connected to the venue via a network. The display device may be any of a number of light emitting display devices such as an LCD display, an LED or OLED display, a plasma display, a field emission device (FED) display or a projector, including a digital micro-mirror device (DMD), an LCD light-valve, or a scanning laser display. The photo sensors 106, 108 and 110 may include an electronic imager, such as a complementary metal oxide semiconductor (CMOS) imager, a micro electromechanical systems (MEMS) imager, or a charge coupled device (CCD) imager that provides electronic signals representing images of the venue. Alternatively, the photo sensors 106, 108 and 110 may include a photodetector such as a photodiode, photo transistor, and/or a photo resistor that provides a signal representing a level of illumination in the venue.

Figure 1A:
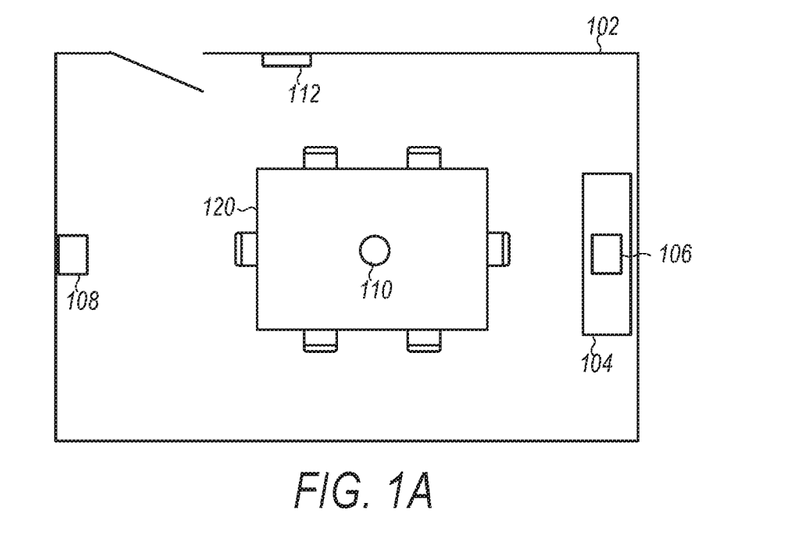
FIG. 1A is cut-away top-plan drawing of a conference venue.

FIG. 1A is a cut-away top-plan view of a venue 102. The venue includes a venue system 104, which as shown in FIG. 1C includes a display screen 105 speakers 116 and a camera 106. The camera 106 is configured to capture images of conference participants in the venue, during a presentation. While the camera 106 is shown positioned on top of the display screen 105, it is contemplated that cameras may be arranged at other locations in the venue. For example the camera may be positioned on the opposite side of the venue as shown by item 108 in FIGS. 1A and 1B. Alternatively, a camera 110 may be positioned on a conference table 120 in the venue. The display screen 105, shown in FIG. 1C, may be a light emitting display. Alternatively, as shown in FIG. 1B, the display device may be a projector 114 that projects an image on a passive display screen 105.

In one embodiment, each of the cameras 108 and/or 110 includes a respective imager that may capture images displayed on the display screen 105, and the imagers in the cameras 106, 108 and/or 110 may capture images of the venue including light reflected from the walls and furniture. A processor in the venue system 104 compares the captured images or light to expected data to automatically determine whether the display device and/or imager is operating properly. While FIGS. 1A, 1B and 1C show cameras 106, 108, and 110 having electronic imagers, other embodiments may use a photodetector, such as a photodiode, phototransistor, photo resistor or other light-sensitive device to capture light emitted by or reflected by the display screen 105. As used herein, the term "photo sensor" includes a photodetector and/or an electronic imager.

Figure 1B:
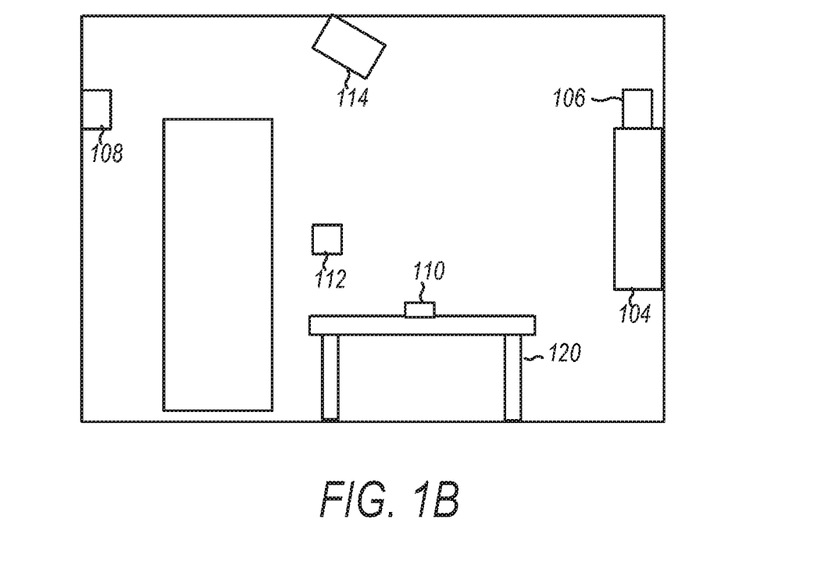
FIG. 1B is a cut-away side plan view of the conference venue shown in FIG. 1A
Figure 1C:
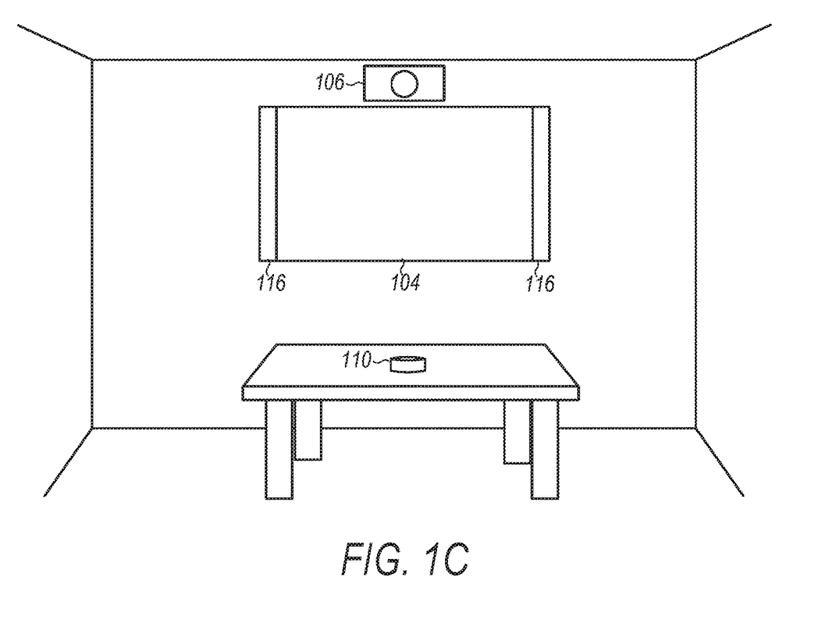
FIG. 1C is a perspective view of the venue shown in FIGS. 1A and 1B.

The venue shown in FIGS. 1A, 1B, and 1C may also include a presence detector 112, such as a pyroelectric sensor configured to control light fixtures in the venue based on the venue being occupied. As an alternative to the pyroelectric sensor, the embodiments described below may employ other types of motion sensors, such as an analysis of successive images of the venue provided by one or more of the cameras 106, 108, and 110. Such a motion sensor may be implemented, for example, by subtracting a newly captured image from a previously captured image. Because the camera 106, 108 or 110 is in a fixed position, a difference between the two images represents motion in the field of view of the camera. While the systems described the examples below may operate in the presence of motion, the example systems provide more accurate results when operated in the absence of motion. Thus, in some examples, the system is configured to operate at times when it is unlikely that the venue is occupied and has little or no ambient lighting, for example, between 2:00 a.m. and 4:00 a.m.

It may also be desirable to operate the system when no one is present in the venue because, as described below, some example displayed test sequences use multiple flashed images that occupants of the venue may find annoying or that may have adverse psychophysical effects, for example if an occupant suffers from epilepsy. To mitigate any such psychophysical effects, the amplitude of the displayed data may be reduced and/or the flashing frequency in the examples described below may be selected to be between 0.1 Hz and 3 Hz or between 60 Hz and 200 Hz.

Figure 2:
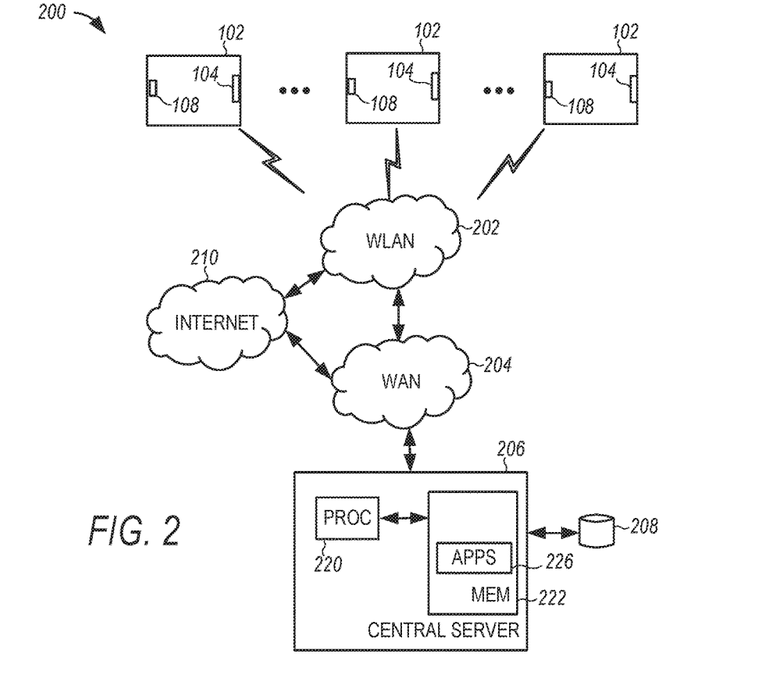
FIG. 2 is a block diagram of an example system in which multiple conference venues communicate with a central server.

FIG. 2 is a block diagram of an example enterprise system 200 in which one or more of the described automatic device monitoring methods or systems may be implemented. As shown, multiple venues 102 include venue systems 104 that communicate with a WLAN 202. Each venue 102 also includes a photo sensor or camera 108. Although not shown in FIG. 2, each of the venues may include any or all of the elements shown in FIGS. 1A, 1B, and 1C. The WLAN 202, in turn, communicates with a WAN 204. The organizer or participant may communicate with the central server 206 through the WLAN 202 and/or the WAN 204. The WAN 204 may be an enterprise WAN for the company or it may be the Internet. When the WAN 204 is an enterprise WAN, it may be connected to a global information network (e.g. the Internet) 210. When the WAN 204 is the Internet, the connections to the Internet 210 shown in FIG. 2 may, instead, connect to the WAN 204. As shown in FIG. 2, the WLAN 202 may connect to the Internet 210 directly or through the WAN 204.

In one embodiment, a central server 206 includes a processor 220 and a memory 222. The server 206 may also include a network interface, an input/output interface (I/O), and a user interface (UI). For the sake of clarity the UI and I/O elements are not shown in FIG. 2. The memory 222 may include software modules that implement application programs (APPs) 226, such as a display device monitoring program described with reference to FIGS. 4-7 below. In addition, the memory may hold the software for the operating system (not shown). Although the APP 226 is shown as being implemented in the central server 206 it is contemplated that the APP 226 may, instead or in addition be at least partly implemented in the venue system. For example the venue system 102 may test the display device and the central server 206 may collect data on the status of multiple display devices in the various venues 102 of the enterprise.

Figure 3:
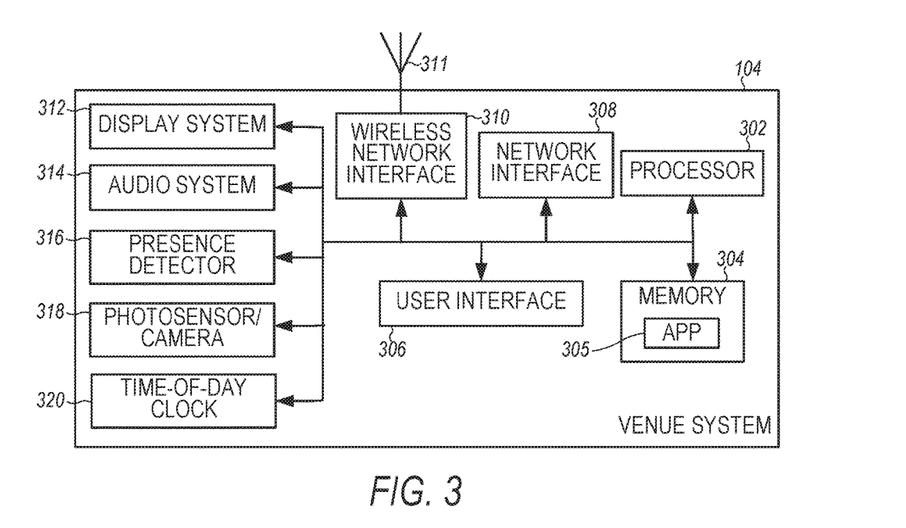
FIG. 3 is a block diagram of an example of a venue system.

FIG. 3 is a block diagram of an example venue system 104. The venue system 104 includes a processor 302; a memory 304; a user interface 306; a physical network interface 308; a wireless network interface 310 including an antenna 311; a display system 312, including display screen 105 and/or the projector 114; an audio system 314, including speakers 116; an interface 316 to the presence detector 112; an interface 318 to one or more of the cameras and/or photo sensors 106, 108, and 110; and an interface 320 to a time of day clock. The physical network interface 308 may couple the venue system 104 to an optical or wired network in the building 110. The wireless network interface may include one or more of a Wi-Fi transceiver, a ZigBee transceiver, a Bluetooth transceiver, an NFC transceiver, an optical (e.g. infrared) transceiver or an ultrasonic transceiver to provide short-range communications within and beyond the venue 102. The memory 304 may include application software 305 which implements an example display monitoring system. As described above, this application software may, alternatively, be implemented in the central server 206, shown in FIG. 2, or between the venue system 102 and the central server 206. Although not shown in FIG. 3, the venue system 104 may also control the environment of the venue. For example, in order to ensure that light from the display 106, 108 or 110 is properly captured, it may be desirable to turn off the ambient lighting in the room. This may be performed by the venue system 104 prior to displaying the test sequence. In this example, the venue system may use the presence detector 316 to determine whether the venue is occupied before turning off the ambient lighting.

Figure 9:
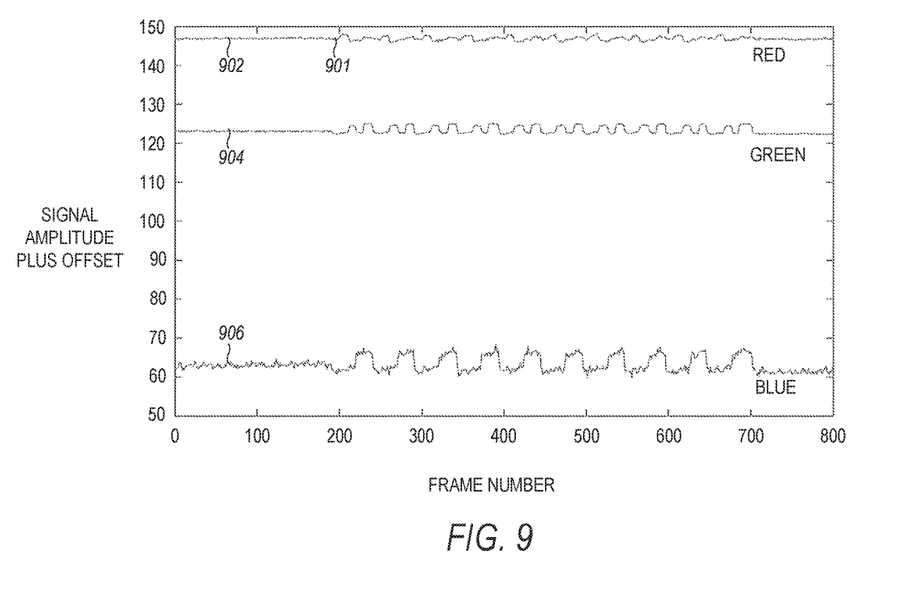
FIG. 9 is a graph of signal amplitude versus frame number.

FIGS. 4-7 describe an example display monitoring method. As set forth below, the method describes operations performed by the venue system 104 and/or central server 206 under control of one or both of the APPS 226 and 305. One example method sequentially displays full-screen monochrome images of red, green, blue, white, and black image frames. This display sequence may be repeated several times during a test interval. In one embodiment, data from each component (e.g. red, green, blue) of each line of each color are averaged and the values for the lines of each component in a frame are averaged to produce three values per frame, one corresponding to each component. FIG. 9 is a graph of signal amplitude versus frame number showing output data for an example in which, between frames 200 and 700, the sequence of 10 frames each of black, red, green, blue and white are displayed and the display sequence is repeated 10 times. When the display device has a frame rate of 30 Hz, this example sequence has a flash rate of about 3 Hz. As described above, it may be desirable to have a slower or faster rate of flashing for the sequence. Example embodiments cause the image on the screen to flash at a rate between 0.1 Hz and 3 Hz or between 60 Hz and 200 Hz.

In some embodiments a different sequence may be used. For example instead of red, green, and blue, the venue system 104 may cause the display screen 105 to flash cyan, magenta, and yellow. In other embodiments, different color sequences may be used as long as the signals cover all of the component colors that may be emitted or reflected by display screen 105. Furthermore the white and/or black sets of frames may be omitted. In the examples described below, the groups of monochrome frames flash in the sequence of red, green, blue, white, and black. The ordering of the colors in the sequence is one example it is contemplated that the system may display the frames with a different color ordering. As described above, this sequence may repeat several times during a display testing interval. It is also contemplated that the display sequence may be a pseudo-random sequence in which the colors are displayed for set times according to the pseudo-random sequence or in which the amount of time that each color is displayed is determined from the pseudo-random data. Using a pseudo-random sequence may reduce undesired correlation with other periodic sequences possibly existing in the environment (e.g., a flashing neon sign, a sub-harmonic of a compact fluorescent bulb, or a blinking LED on other equipment in the venue.

The system compares the captured image data to the expected results to detect possible malfunction of the display device and/or photo sensor. This comparison may be a direct comparison whenever a calibration signal has been previously acquired for the venue. When such a sequence has not been acquired, or is not available, a simple cross correlation measure may suffice to indicate proper working. More specifically, the cross correlation may be between the signals being displayed and the (possibly delayed) signals received at the sensor. This cross-correlation may be computed and compared to a cross correlation with signals captured by the photo sensor when the display device is not displaying the display sequence. Malfunctions that may be detected include missing parts of the displayed images, missing components, or light levels of a component which are outside of specification light levels. Similar faults may be detected in the photo sensor or imager.

In the graph of FIG. 9, the amplitudes of the red 902, green 904 and blue 906 signal measurements are offset and amplified to show their variations. In the graph, it is noted that the red signal 902 and the green signal 904 show two peaks in each frame sequence, one corresponding to the respective red or green signal and one corresponding to the white signal. In the blue signal, these peaks are merged as the display of the ten white frames immediately follows the display of the ten blue frames. As shown in FIGS. 1A and 1B, depending on which camera is used, 106, 108 or 110, the camera may capture an image of the display screen 105 or an image of the room illuminated by the display screen 105.

For example, the camera 106 points away from the screen 105 and, so, the camera 106 cannot capture an image of the display screen 105. Whether the imager of the camera 106 captures an image of the screen 105 or a camera or photo-detector captures light in the room as illuminated by the screen 105, the data provided by the imager or photo sensor is sufficient for the venue system 104 and/or the central server 206 to determine whether the display device coupled to the screen 105 and/or the photo sensor or camera 106, 108 and/or 110 is operating properly.

Figure 4:
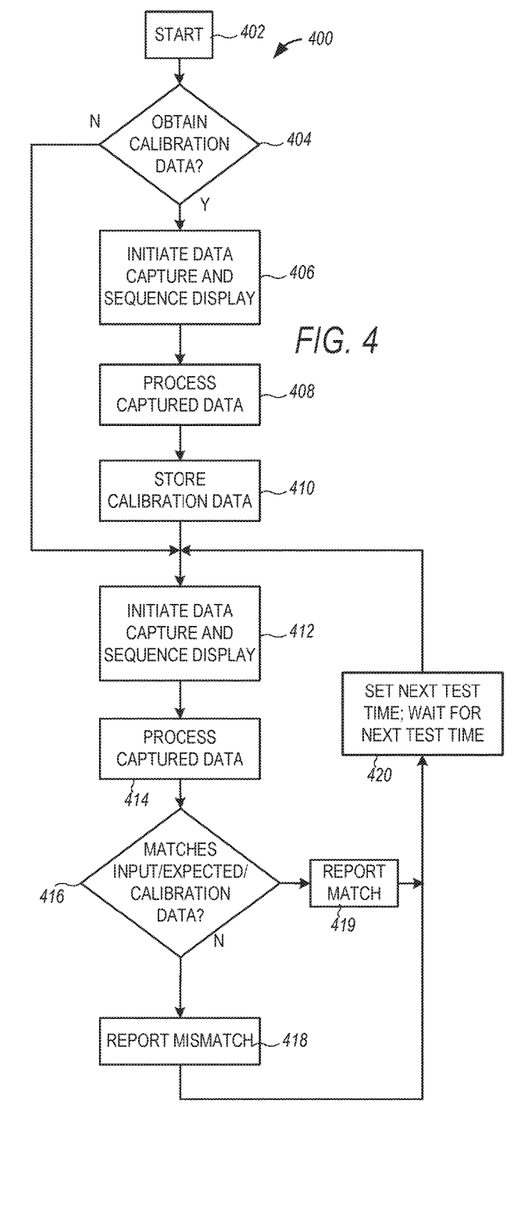
FIG. 4 is a flowchart diagram of an example automated display testing system.

FIG. 4 is a flowchart diagram of an example display testing application. As described above this testing application may be implemented either on the conference venue system 104 or the central server 206. It is also contemplated that parts of the system may be implemented on the venue system 104 and other parts may be implemented on the central server 206.

The example display monitoring method begins at 402. At 404 the method determines whether the expected sequence is a calibration sequence and the calibration sequence is to be obtained. The system may be calibrated, for example, by collecting data from a set of test images of the display sequence and saving the collected data as calibration data to be used to compare against data captured during display testing. If, at block 404, the system is to be calibrated the method captures and stores a calibration sequence as described below with reference to blocks 406, 408 and 410.

Alternatively, the expected sequence may be calibration data provided by the central server 206. In one example, an imager of a camera 108 may be configured to capture an image of the screen 105 and the calibration data provided by the central server 206 may include a set of calibration images. In this example, venue system 102 or central server 206 may compare data captured by the camera 108 to the calibration images. In this alternative, the test sequence itself, (i.e. the input data to the display device, possibly delayed to compensate for processing delay in the display device) may be used as the calibration sequence. The method may compare the data captured by the camera 108 to the test sequence or to the calibration sequence using cross-correlation.

In another alternative, the expected sequence may be data describing the order and timing of the color signals in the test sequence.

When block 404 determines that a calibration sequence is to be obtained, the method, at block 406, initiates data capture and sequence display. Briefly, this block causes the display device to initiate the test sequence and causes the imager to capture light from the display device. The operations performed by 406 are described in more detail below with reference to FIGS. 5 and 6. After block 406 captures the data from the test sequence, block 408 processes the captured data. This processing may include, for example, simply storing the captured data and/or determining a target amplitude level for each signal and preforming a fast Fourier transform (FFT) on the data from each color channel to identify dominant frequency peaks. These values may be used to compare corresponding values from captured test sequences to determine whether the test sequences match the calibration data. At block 410 the method stores calibration data. The processing described above only one example. It is contemplated that other types of processing may be used, for example, generating respective templates for each of the signals from the calibration data, where, the data produced during testing may be subtracted from the template and a match indicated if differences between the testing data and the calibration template are greater than a threshold. Alternatively, the system may not use calibration data and simply monitor each of the color signals for variations in timing and amplitude corresponding to an expected display sequence.

When, at block 404, the system a calibration sequence already exists or the expected sequence is not a calibration sequence, or after block 410, the method initiates a test sequence to test the display device and/or imager. At block 412 the method initiates data capture and sequence display as described below with reference to FIGS. 5 and 6. After block 412, the method processes the captured data at block 414 and, at block 416, determines whether the processed captured data matches the expected sequence. The processing of the expected sequence occurs as described above with reference to block 408. Depending on the display sequence and the expected sequence, the matching operation may determine: whether an individual color component is missing or has a different color saturation value than specified for the sequence, whether there is a mismatch between the timing and/or amplitude (brightness) of the captured test data and the expected sequence, and/or whether a cross-correlation between the captured data and the expected sequence indicates a match.

When block 416 determines that the captured data matches the expected sequence the method reports the match at block 419. This report may be sent to the central server 206, shown in FIG. 2. Alternatively the method may store the report on the venue system 104 for later retrieval by the central server 206. Similarly, when block 416 determines that the processed captured data does not match the expected sequence, block 418 may report the mismatch either to the venue system 104 or to the central server 206. After block 418 and block 119, the method, at block 420, sets the next test date and time and enters a sleep state to wait for the next test time. Block 420 is described below in detail with reference to FIG. 7. In one example, the display devices may be tested once a day during a preset time interval (e.g. 2:00 a.m.-4:00 a.m.). After a successful test, block 420 may set the next test time to the next day at the preset time. As shown in FIG. 3, the venue system 104 may include an interface to a time of day clock to determine the current date and time.

The matching operation referred in 416 may be computed in a number of ways. If no calibration data is available, the test may involve computing the cross-correlation between the displayed sequence and the corresponding received signal to be displayed by the display device. In this example, a match may be determined by comparing with the computed cross correlation to a cross-correlation obtained when the test sequence is not being displayed. When calibration data is available, the comparison may be a direct comparison with the calibration data, a comparison of the cross-correlation between the display sequence and the received signal during calibration and during the test. Alternatively, the matching operation may use any of other many methods that detect the presence, strength, and duration of a signal.

Figure 5:
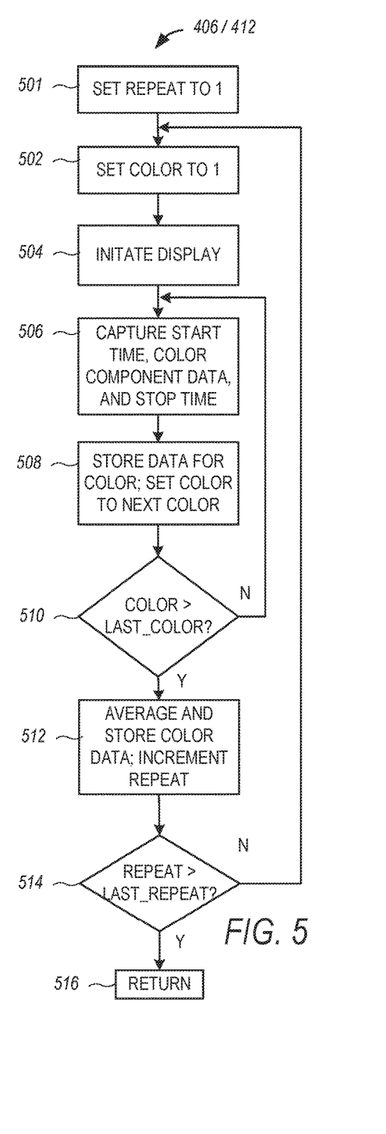
FIGS. 5, 6, and 7 are flowchart diagrams providing further details of the flowcharts shown in FIG. 4.

FIG. 5 is a flowchart diagram of an example method for initiating and capturing the sequence display as described above in blocks 406 and 412 of FIG. 4. For example, the method disclosed in FIG. 5 may be called from the method of FIG. 4 at blocks 406 and 412. The example method shown in FIG. 5 displays a sequence of colors having a number of colors equal to a constant value LAST_COLOR (e.g. three) where each sequence is repeated a number of times equal to a constant value LAST_REPEAT (e.g. ten). At blocks 501 and 502, variables REPEAT and COLOR are initialized to have a value of one. At block 504, the example method initiates the display on the display device. As shown in FIG. 9, the display may include a sequence including multiple copies each of red, green, blue, white, and black frames. At block 506, the method captures the start time color component data and stop time for each set of all frames of each of the colors (e.g. red, green, blue, white, and black). The operation of block 506 is described below in more detail with reference to FIG. 6.

After block 506, the method, at block 508 stores data for the color (e.g. red) represented by the current value of the variable COLOR and the sets the variable COLOR to a value corresponding to the next color (e.g. green). After block 508, the method determines in block 510 whether the color (e.g. red, green, blue, white, or black) of the frames that were just processed corresponds to the last color in the sequence. If not, control branches to block 506 to process the color frames of the next color in sequence.

When block 510 determines that the frames just processed were for the last color sequence, control transfers to block 512 which averages the data stored each of the frame colors and increments the variable REPEAT. Block 514 determines whether the last repeat of the sequence has been processed (i.e. whether the variable REPEAT is greater than a value LAST_REPEAT). If the last repeat of the sequence has not yet been processed control transfers to block 502 to initiate the display and processing of the next sequence of color frames. When, at block 514, the method determines that the last repeat has been processed block 516 returns control to the calling method.

Figures 6, 7:
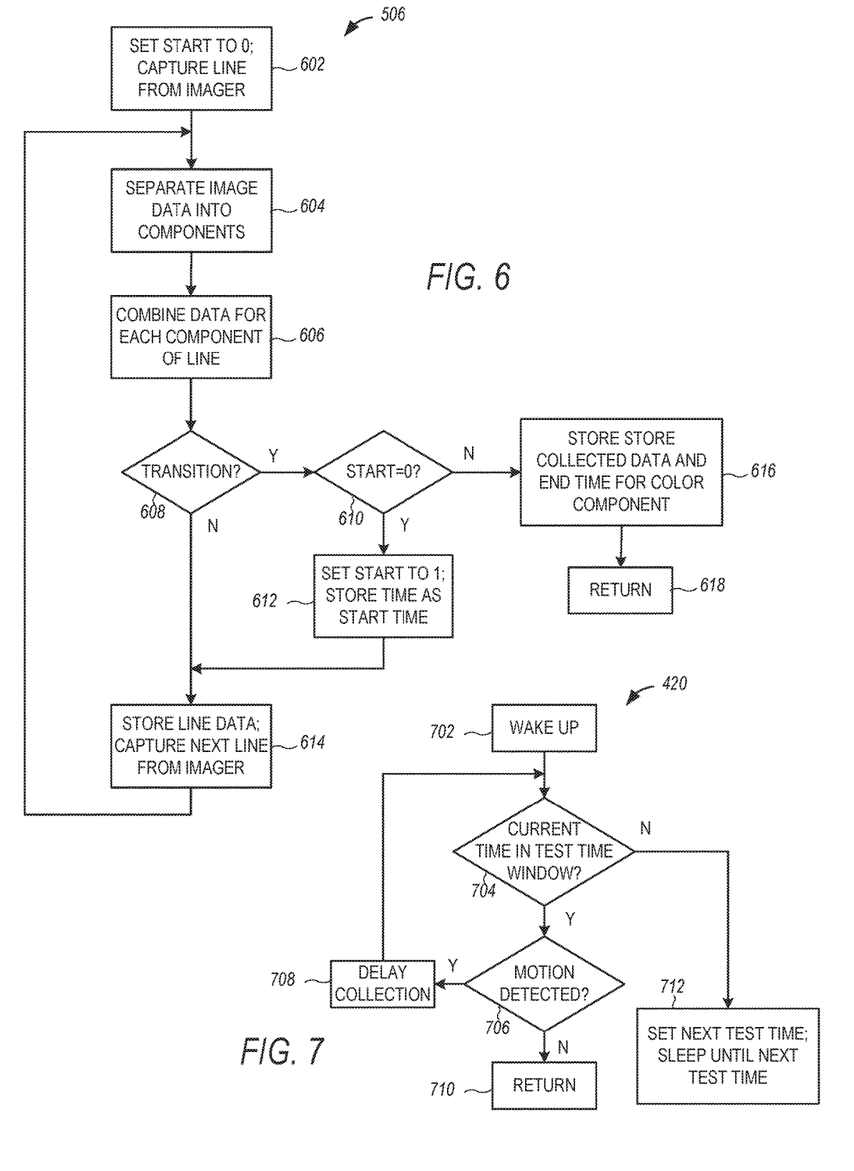

FIG. 6 is a block diagram of the example operations that may be performed by block 506 of FIG. 5. The method shown in FIG. 6 assumes that the imager capturing the light emitted by the display screen 105 is an active pixel sensor (APS) sensor such as a complementary metal oxide semiconductor (CMOS) imager. APS imagers typically use a rolling shutter in which each line of image data is read out from the imager sequentially, after a fixed integration time. Unlike CCD imagers, APS imagers do not produce an image only at the end of the frame. Due the use of the rolling shutter, a frame captured by the imager may include portions of two successive frames displayed on the display screen 105.

Figure 8A:
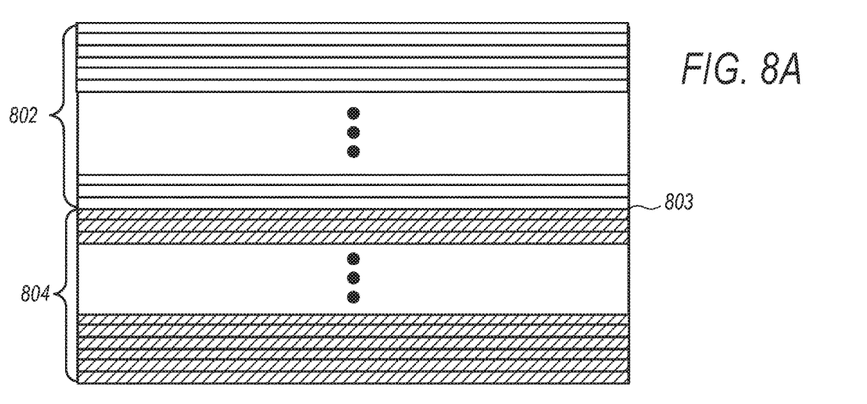
FIGS. 8A and 8B are image diagrams that are useful for explaining the operation of the system using an active pixel sensor imaging device.
Figure 8B:
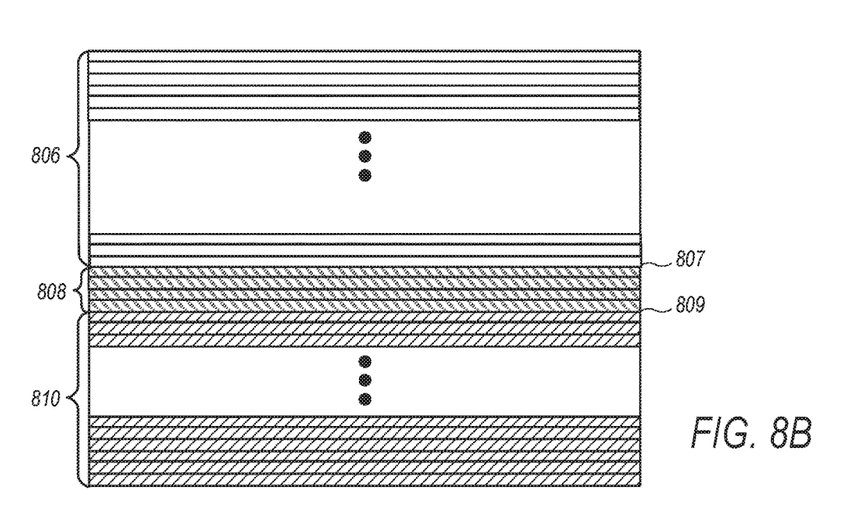

The operation of the rolling shutter is illustrated in FIGS. 8A and 8B. As shown in FIG. 8A, the transition between a frame of one color (e.g. red) and the next color (e.g. green) occurs at a time corresponding to the readout of line 803 from the APS imager. In this example the lines 802 are lines of the red image and the lines 804 are lines of the green image. In order to properly process the data captured by the imager 106, 108, or 110, the system processes each line from the imager separately. As shown in FIG. 8B, some display devices may not transition directly from one frame to the next but may include a number of blank lines between the frames. In FIG. 8B the lines 806 represent final lines of one frame (e.g. a red frame) while the lines 810 represent the initial lines of a next frame (e.g. a green frame). The lines 808, beginning at line 807 and ending at line 809 are the blank lines between the two frames. The method shown in FIG. 6 assumes that the imager operates as shown in FIG. 8A. When an imager such as that shown in FIG. 8B is used the method may need to be adapted to ignore the blank lines 808 between the two frames.

The method of FIG. 6 begins at block 602 which sets a variable START to 0 and captures a line of image data from the imager. At block 604, the method separates the captured image data into components (e.g. red, green, and blue). The method combines the image data for each component in the line at block 606. This generates a single value for each of the components, red, green, and blue, for each line of data provided by the imager. At block 608 the method determines whether there has been a transition in the image produced by the imager. The transition may be detected, for example, by comparing the red green and blue values from the previous line to the values that were just computed for the current line. When the differences between each or any of these values is greater than a threshold amount (e.g. a threshold that may be between 10% and 90%) block 608 determines that a transition has occurred.

When block 608 finds a transition, block 610 determines whether the variable START is equal to zero. When start is equal to zero the transition represents the start of a frame of a new color. This transition, for example, represents the transition from black to red as shown in FIG. 9 at item 901. In this instance, the method sets START to 1 and stores the current time as the start time for the new color frame (e.g. the start of the first red frame in the sequence of red frames. After block 612 or after block 608 when no transition is detected, block 614 stores the line data and captures the next line of data from the imager. After block 614 control transfers to block 604 as described above.

At block 610, when start is not equal to zero, the transition detected at block 608 represents the end of a set of frames of the current color. At block 616 the method stores the collected data and stores the current time as the end time for the current color component. After block 616, the method returns control to the calling method at block 618.

FIG. 7 is a flowchart diagram that illustrates the operation of block 420 shown in FIG. 4 in which the method waits until the next test time. This example method causes the system to initiate the display of the test sequence as well as to capture and process the test data. As described above it may the system may be configured so to display and capture the test image data at a time when ambient lighting in the venue may be controlled or may have a known lighting level and when the venue is unoccupied. In one embodiment, the system activates at a time between 2:00 a.m. and 4:00 a.m. and may turn off or dim the ambient lighting before beginning the test operation. At block 702, the method wakes from a sleep state and, at block 704, determines whether the current time is within the test time window (e.g. 2:00 a.m.-4:00 a.m.). When the current time is not within the test time window, the method enters a sleep state until the next test time at block 712. When the method determines at block 704 that the current time is within the test time window block 706 is executed to determine whether motion is detected in the venue.

As described above, motion may be detected using a motion sensor such as the example pyroelectric sensor 112 shown in FIGS. 1A and 1B or by analyzing data provided by the imager or photo sensor for differences between successive frames under constant illumination. When the method determines that motion has been detected, block 708 implements a delay for a predetermined amount of time, for example, five minutes. After the delay at block 508, control transfers to block 704 as described above. When no motion is detected at block 706, the method returns control to the calling process to begin displaying the test sequence and collecting test data.

The example methods and systems described above implement a flexible method for determining whether a display device is operating properly or if it has been tampered with (e.g. moved from the location from which the calibration data was obtained). These methods and systems may be used with a camera facing toward or away from the display device. Furthermore, although the examples are described in terms of detecting the proper operation of the display device, they may also be used to detect problems with the imager. When, for example, data corresponding to one or more image lines is always zero, the data may indicate a problem with the row selection mechanism of the imager.

It is contemplated that the method may also be adapted to identify other problems with the display device or imager for example, rather than generating a single value for each color in a frame, the display device may be programmed to display a known image which is then captured by the imager. The system may compare the captured image to an expected image. Differences between the captured image and the expected image may indicate problems with the imager and/or, when the expected image is a calibration image, the display or may indicate that the imager and/or display have been moved from the position at which the calibration data were obtained. As described above, the expected image may be the test input image and differences between the input image and the expected image may indicate a fault. For example detection of an out of focus image by comparison of spatial frequency components between the input image and the test image may indicate a need to adjust the focus of the projector 114 shown in FIG. 1B.

EXAMPLE 1

In one example, apparatus for monitoring a display device in a venue is coupled to a photo sensor and to the display device. The apparatus also includes a processor configured to cause the display device to display a test sequence of image frames on a display screen. The processor is configured to receive data from the photo sensor representing light from the display screen during display of the test sequence. The processor is further configured to determine whether the received data indicates one or more errors in the displayed test sequence and, when one or more errors is detected, to record the detected errors.

In one example, the processor is configured to determine whether the received data indicates errors in the displayed test sequence by comparing the received data to data representing an expected sequence.

In one example, the photo sensor includes an electronic imager that provides image pixels corresponding to an image of the venue.

In another example, the test sequence includes successive monochromatic images; and the processor is configured to: separate the received data into color component parts and compare temporal variations in the separated color component parts to corresponding component parts of the expected sequence.

In yet another example, the test sequence includes at least one image having a spatial pattern; the electronic imager is configured to capture images of the display screen; and the processor is further configured to compare the received image data representing the display screen to an expected image of the display screen in the expected sequence to determine whether the received data matches the expected data.

In another example, the electronic imager includes an active pixel sensor (APS) imager that captures image data using a rolling shutter and the processor is configured to combine pixels in lines of pixels provided by the electronic imager and to compare the combined pixel values to corresponding combined pixel values in the expected sequence.

In yet another example, the processor is configured to average the received data representing all of the pixels of each component part of the data from each image frame to generate a sequence of average values for each component and to compare the average values to corresponding average values of the expected sequence.

In another example, the photo sensor includes a photo-diode, a photo-transistor, or a photo-resistor, the apparatus further includes an analog-to-digital converter, configured to digitize output signals provided by the photodiode, and the processor is configured to compare the digitized samples to corresponding successive values of the expected sequence.

In yet another example, the successive image frames are displayed at a frame rate between 0.1 Hz and 3 Hz or between 60 Hz and 200 Hz.

In another example, the processor is coupled to a motion detector and is configured to receive the data from the photo sensor representing light from the display screen, when the motion detector indicates that there is no motion in the venue.

In yet another example the processor is responsive to a time signal indicating time of day to receive the data representing the light captured by the photo sensor from the display screen when the time signal indicates a time of day that the venue is likely to be unoccupied.

EXAMPLE 2

In one example, a method for monitoring a display device includes displaying a test sequence of image frames on a display screen and receives data representing light from the display screen during display of the test sequence. The method determines whether the received data indicates errors in the displayed test sequence, and when one or more errors is detected, records the detected errors.

In one example, the method detects errors in the displayed test sequence by comparing the received data to data representing an expected sequence.

In one example, the method receives image pixels corresponding to an image of the venue.

In another example, the method displays, on the display screen, successive monochromatic images as the test sequence; and the method separates the received data into color component parts and to compares the separated color component parts to corresponding component parts of the expected sequence.

In yet another example, the test sequence includes at least one image having a spatial pattern and the method receives, in the received data, data representing images of the display screen and compares the received image data representing the images of the display screen to an expected image in the expected sequence to determine whether the received data matches the expected sequence.

In another example, an electronic imager includes an active pixel sensor (APS) imager that captures image data using a rolling shutter and the method combines pixels in respective lines of pixels provided by the electronic imager and processes the combined pixel values to detect the mismatches between the combined signals of the captured image data and corresponding combined signals of the expected sequence.

In yet another example, the method averages all of the pixels of each component part of the data from an image frame to generate a sequence of average values for each component and compares the average values to corresponding average values of the expected sequence.

In yet another example, the method displays the successive image frames at a frame rate between 0.1 Hz and 3 Hz or between 60 Hz and 200 Hz.

In another example, the method detects motion in the venue and receives the data from the photo sensor representing light from the display screen, when the motion detector indicates that there is no motion in the venue.

In yet another example the method receives a time signal indicating time of day and receives the data representing the light from the display screen during the test sequence when the time signal indicates a time of day that the venue is likely to be unoccupied.

EXAMPLE 3

In one example, a non-transitory computer-readable medium includes program instructions configured to cause a processor coupled to a display device that displays images on a display screen and a photo sensor that senses light in a venue, the program instructions being configured to cause the processor to cause the display device to display a test sequence of image frames on a display screen. The program instructions are further configured to cause processor to receive, from the photo sensor, data representing light from the display screen during display of the test sequence, to determine whether the received data indicates one or more errors in the displayed test sequence and, when one or more errors is detected to record the detected errors.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the scope of the appended claims.

In particular and in regard to the various functions performed by the above described components, devices, circuits, systems and the like, the terms used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the disclosed example embodiments and implementations include a system as well as computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned example systems have been described with respect to interaction among several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Furthermore, while a particular feature of the claimed subject matter may have been disclosed with respect to one of several implementations, such feature may be combined with one or more other features of the other implementations as may be desired and advantageous for any given or particular application. In addition, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. Apparatus for monitoring a display device in a venue, the apparatus comprising:
    a processor coupled to the display device having a display screen and to a photo sensor that points away from the display screen to capture an image of at least a portion of the venue without capturing an image of the display screen the processor configured to:
    cause the display device to display a test sequence of image frames on the display screen;
    receive data representing light from the display screen captured by the photo sensor during display of the test sequence of image frames the data including data representing light reflected by the venue and not including an image of the display screen;
    compare the received data to data associated with a calibration sequence of expected image frames to detect a mismatch between the received data and the data associated with the calibration sequence of expected image frames to identify an error in the displayed test sequence of image frames;
    record the detected error; and
    report the detected error to cause servicing of the display device.

2. The apparatus of claim 1, wherein:
    the processor is configured to determine whether the received data indicates an error in the displayed test sequence of image frames by detecting a mismatch between the received data and data representing the calibration sequence of expected image frames; and
    the processor is configured to record the detected mismatch.

3. The apparatus of claim 2, wherein:
    the apparatus further comprises the display device and the photo sensor; and wherein the photo sensor includes an electronic imager that provides image pixels corresponding to an image of the venue as the captured data.

4. The apparatus of claim 2, wherein:
the test sequence of image frames includes successive monochromatic image frames having different colors; and
the processor is configured to:
separate the received data into color component parts; and
compare the separated color component parts to corresponding color component parts in the calibration sequence of expected image frames.

5. The apparatus of claim 3, wherein:
the electronic imager includes an active pixel sensor (APS) imager that captures image data using a rolling shutter;
the processor is configured to:
combine pixels in lines of pixels provided by the electronic imager to generate the data representing light from the display screen captured by the photo sensor during display of the test sequence of image frames; and
process the combined pixel values to detect the mismatch between the combined pixels and corresponding combined pixel values in the calibration sequence of expected image frames.

6. The apparatus of claim 5, wherein the processor is configured to average the received data representing a plurality of the pixels of each component part of the data from each image frame of the test sequence of image frames to generate a sequence of average values for each component and to compare the average values to corresponding average values in the image frames of the calibration sequence of expected image frames.

7. The apparatus of claim 2, wherein:
the photo sensor includes a photodetector;
the apparatus further includes an analog-to-digital converter, configured to digitize output signals provided by the photodetector; and
the processor is configured to compare the digitized samples to corresponding successive values of the calibration sequence of expected image frames.

8. The apparatus of claim 1, wherein the processor is configured to receive motion data from a motion detector in the venue and to receive the data representing the light from the display screen when the motion data indicates that there is no motion in the venue.

9. The apparatus of claim 1, wherein the processor is responsive to a time signal indicating time of day to receive the data representing the light captured by the photo sensor from the display screen when the time signal indicates a time of day that the venue is likely to be unoccupied.

10. A method for monitoring a display device in a venue comprises:
generating a display of a test sequence of image frames on a display screen;
receiving data representing light from the display screen during display of the test sequence of image frames, the light being captured by a photo sensor that points away from the display screen to capture an image of at least a portion of the venue without capturing an image of the display screen, the data including data representing light reflected by the venue and not including an image of the display screen;
comparing the received data to data associated with a calibration sequence of expected image frames to detect a mismatch between the received data and the data associated with the calibration sequence of expected image frames;
recording the detected mismatch; and
reporting the detected error to cause servicing of the display device.

11. The method of claim 10, wherein receiving the data representing light from the display screen includes receiving image pixels corresponding to an image of the venue.

12. The method of claim 10, further comprising:
displaying successive monochromatic images as the test sequence;
separating the received data into color component parts; and
comparing the separated color component parts to corresponding component parts of the calibration sequence of expected image frames.

13. The method of claim 10, further comprising:
receiving lines of pixel data representing the light from the display screen from an active pixel sensor (APS) imager that captures image data using a rolling shutter;
combining the pixel data in respective lines of the pixel data provided by the APS imager; and
processing the combined pixel data to detect the mismatch between the combined signals of the captured image data and corresponding combined signals of the calibration sequence of expected image frames.

14. The method of claim 13, further comprising:
separating the received pixel data into color component parts;
averaging a plurality of the pixels of each color component part from an image frame to generate a sequence of average values for each color component part; and
comparing the average values to corresponding average values of the calibration sequence of expected image frames.

15. The method of claim 10, further comprising displaying the test sequence of image frames at a frame rate between 0.1 Hz and 3 Hz or between 60 Hz and 200 Hz.

16. The method of claim 10, further comprising:
receiving a signal from a motion detector representing motion in the venue; and
receiving the data representing the light from the display screen, when the signal from the motion detector indicates that there is no motion in the venue.

17. The method of claim 10, further comprising:
receiving a time signal indicating time of day; and
displaying the test sequence of image frames and receiving the data representing the light from the display screen when the time signal indicates a time of day that the venue is likely to be unoccupied.

18. A non-transitory computer-readable medium, configured for use with a processor coupled to a display device that displays images on a display screen and to a photo sensor pointed away from the display screen to capture an image of the venue without capturing an image of the display screen, the computer readable medium including program instructions configured to configure the processor to:
cause the display device to display a test sequence of image frames on the display screen;
receive, from the photo sensor pointed away from the display screen, data representing light from the display screen during display of the test sequence of image frames, the data including data representing light reflected by the venue and not including data representing an image of the display screen and not including an image of the display screen;
compare the received data to data associated with a calibration sequence of expected image frames to detect a mismatch between the received data and data associated with the calibration sequence of expected image frames;

record the detected mismatch; and report the detected error to cause servicing of the display device.

19. The apparatus of claim 1, wherein the calibration sequence of expected image frames is generated using the display device in the venue.

20. The method of claim 10, wherein comparing the received data to data associated with a calibration sequence of expected image frames includes comparing the received data to a calibration sequence of expected image frames that was generated using the display device in the venue.

21. The non-transitory computer-readable medium of claim 18, wherein the instructions that configure the processor to compare the received data to data associated with a calibration sequence of expected image frames include instructions that configure the processor to compare the received data to a calibration sequence of expected image frames that was generated using the display device in the venue.

\* \* \* \* \*